United States Patent [19]  
Sullivan, Jr.

[11] 4,185,489  
[45] Jan. 29, 1980

[54] SPEEDOMETER TESTER

[75] Inventor: Maurice D. Sullivan, Jr., Overland Park, Kans.

[73] Assignees: Thomas E. Sullivan, Kansas City; III James W. Kirkpatrick, Lenexa, both of Kans.; part interest to each

[21] Appl. No.: 939,494

[22] Filed: Sep. 5, 1978

Related U.S. Application Data

[63] Continuation-in-part of Ser. No. 822,723, Aug. 8, 1977, abandoned.

[51] Int. Cl.² .............................................. G01P 21/02
[52] U.S. Cl. .......................................................... 73/2
[58] Field of Search ...................... 73/2; 324/166–167, 324/173–174, 178–179

[56] References Cited

U.S. PATENT DOCUMENTS

| 3,435,657 | 4/1969 | Weissman | 73/2 |
| 3,626,766 | 12/1971 | Waldecker | 73/2 X |
| 3,710,246 | 1/1973 | Herring | 324/174 X |
| 3,898,563 | 8/1975 | Erisman | 324/174 X |
| 4,083,423 | 4/1978 | Williams et al. | 324/174 X |

FOREIGN PATENT DOCUMENTS 2418873  10/1975  Fed. Rep. of Germany ........... 324/167

Primary Examiner—S. Clement Swisher  
Attorney, Agent, or Firm—D. A. N. Chase

[57] ABSTRACT

The speedometer of a stationary vehicle is evaluated for accuracy and calibrated regardless of vehicle tire size. The powered driven wheel or wheels is/are disengaged from road contact and a detachable housing member with a permanent magnet therein is releasably threaded onto the tire valve stem. A sensor associated with a testing unit is positioned adjacent the housing member so that as the wheels are driven at selected speeds, as indicated by the vehicle speedometer, a train of electrical pulses derived from the sensor is delivered to the testing unit at a rate proportional to the wheel rotative speed. This pulse information, in conjunction with a compensated reference signal generated by a scaler circuit, is processed by computing circuitry in the testing unit resulting in a digital display indicating the actual vehicle speed. The scaler circuit includes a tire size selector providing the testing unit with a number of reference frequencies corresponding to a range of selectable tire sizes.

16 Claims, 10 Drawing Figures

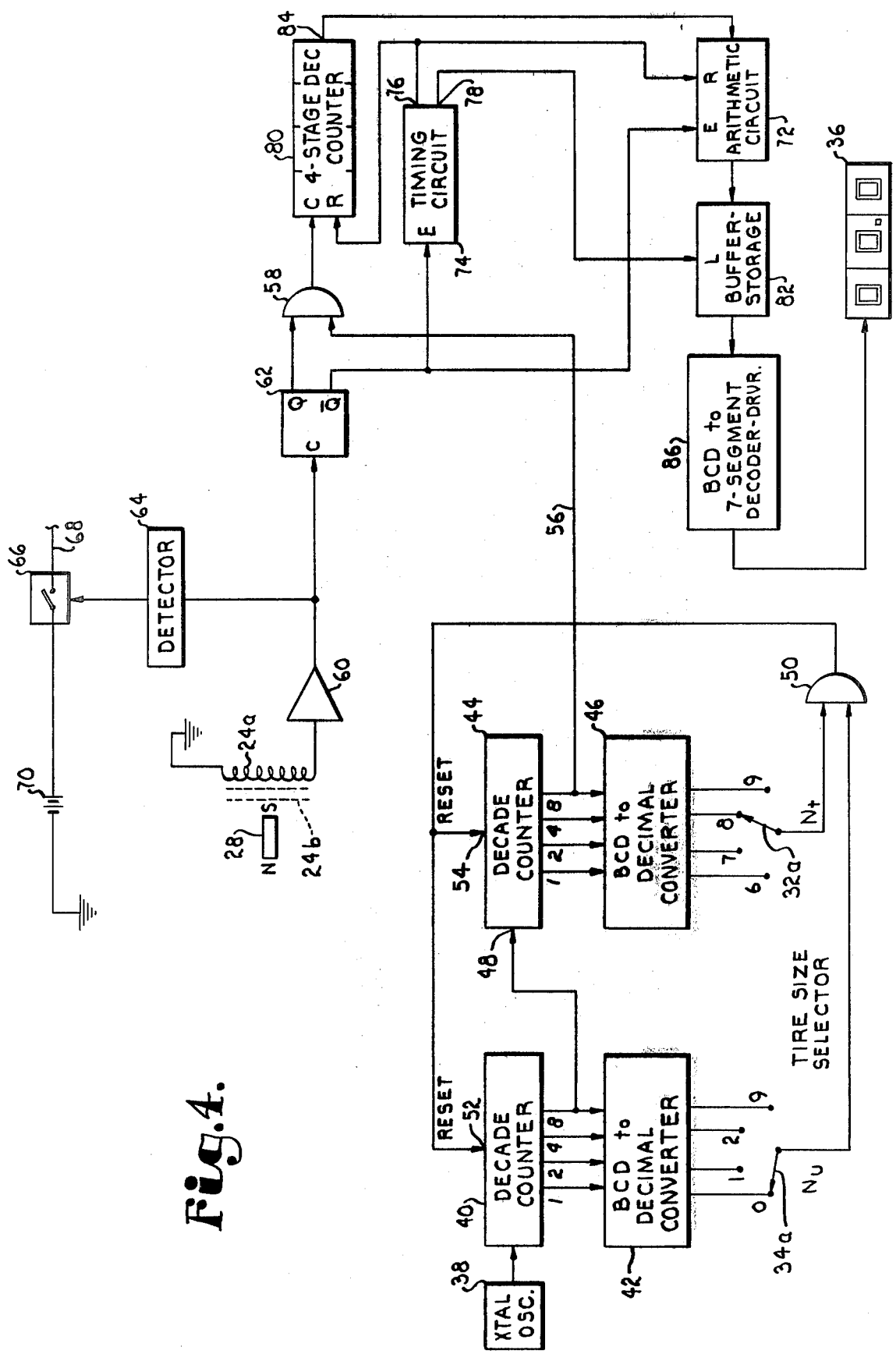

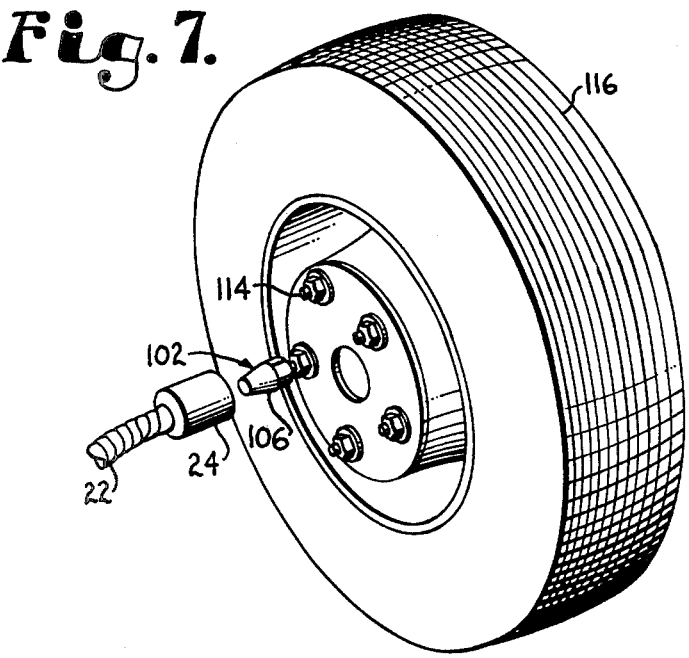
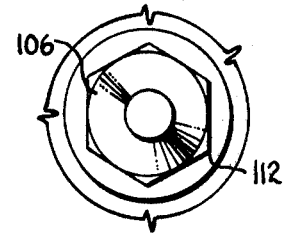
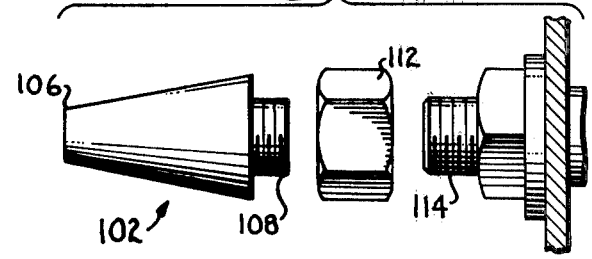
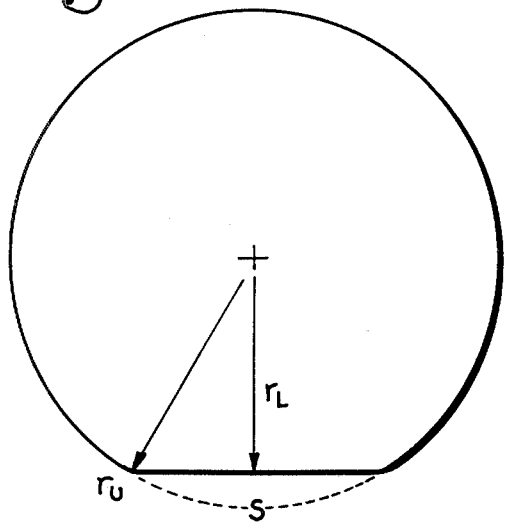
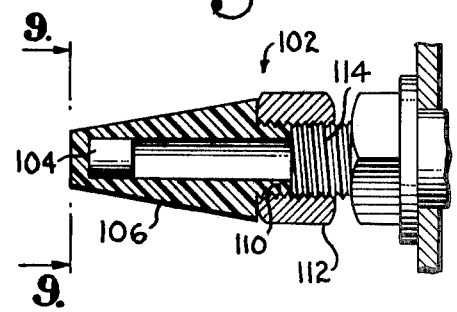

SPEEDOMETER TESTER

CROSS-REFERENCE

This application is a continuation in part of application Ser. No. 822,723, filed Aug. 8, 1977 now abandoned.

This invention relates to improvements in the testing of the speedometers of automotive vehicles and, in particular, to a method and apparatus for rapidly and accurately testing and calibrating a speedometer while the vehicle is stationary.

The speedometers of automotive vehicles supplied as original equipment by the manufacturer are frequently inaccurate, deviations from true speed of ±10 percent being common. Furthermore, the speedometer error may not be uniform over the range of the speedometer, and thus may vary considerably over the normal range of driving speeds.

Heretofore, speedometers have been tested over measured mile courses or between highway mile markers through the use of a stop watch or sweep second hand. This manner of checking is time consuming and tedious and is inherently subject to inaccuracies as, for example, the driver must hold the vehicle at an indicated speed over the measured course. In more sophisticated test situations, a so-called "fifth wheel" may be added to the vehicle in order to provide an accurate speedometer for road testing, but such equipment still necessitates driving the vehicle over a measured course thus resulting in the similar above described disadvantages.

Accordingly, it is the primary object of the present invention to provide a method and apparatus for rapidly and accurately testing the speedometer of a vehicle, wherein the vehicle need not be in motion in order for the test to be conducted.

As corollary to the foregoing object, it is an important aim of this invention to provide a method and apparatus as aforesaid where the vehicle remains stationary during the test but where the simulated vehicle speed may be anywhere in the range of the vehicle speedometer.

Another important object of this invention is to provide a method and apparatus as aforesaid in which the valve stem of the tire of one of the wheels of the vehicle is advantageously utilized to releasably mount a component of the testing apparatus to the wheel to be sensed as the wheel rotates, in order that the apparatus may produce a train of electrical pulses for subsequent computation having a repetition rate proportional to the speed of rotation of the wheel.

Still another important object of the invention is to provide a testing apparatus as aforesaid having a tire size selector for setting the apparatus for the particular tire size of a vehicle under test, and which accurately computes a true functional vehicle speed corresponding to the rotative speed of the wheel and the selected tire size setting.

Yet another important object of the invention is to provide such a testing method in which one or both of the driven wheels of the vehicle are raised off the road surface by a jack or lift so that vehicle speeds may be simulated while the vehicle is stationary, thereby permitting rapid calibration of the speedometer by a simple comparison of speedometer readings with corresponding speed readings computed by the testing apparatus.

A further important object of the invention is to provide a testing apparatus as used aforesaid which compensates for the absence of tire deformation caused by tire/road surface contact so that a true functional vehicle speed may be accurately computed.

Furthermore, it is a specific and important aim of the present invention to provide a speedometer testing apparatus as aforesaid in which a permanent magnet is threadably secured to the valve stem threads of a tire and then sensed during each rotation of the wheel by a suitable pickup head or other sensor positioned adjacent the path of travel of the magnet, and from which sensor a train of electrical pulses is derived having a repetition rate proportional to the speed of rotation of the wheel.

In the drawings:

FIG. 4 is an electrical schematic and logic diagram of the testing apparatus;

FIG. 6 is an exploded side view of another embodiment of the permanent magnet and threaded member housing the same;

FIG. 7 is a perspective view of a truck wheel, showing the embodiment of FIG. 6 in engagement with a lug on the truck wheel;

FIG. 8 is a longitudinal sectional view of the embodiment in FIG. 6 in functional engagement with the truck wheel;

FIG. 9 is an end view along line 9—9 in FIG. 8; and

FIG. 10 is a diagram showing deformation in tire radii and circumference due to normal tire contact with a road surface.

DETAILED DESCRIPTION

Figure 2:
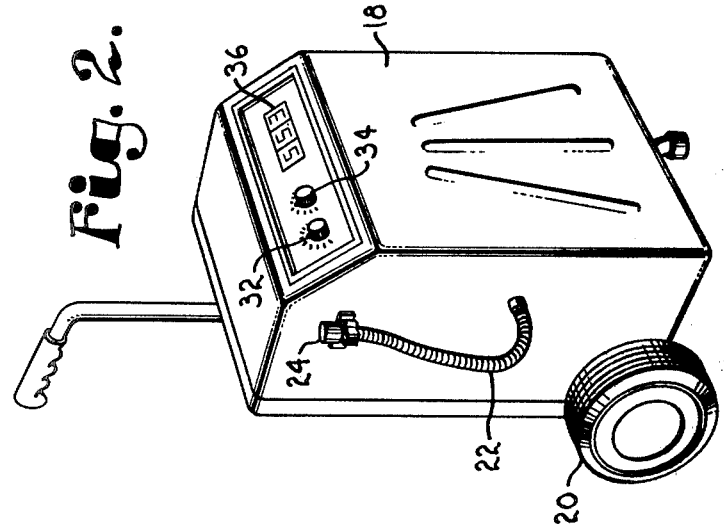
FIG. 2 is another perspective view of the case which houses the testing apparatus, showing the flexible sensor arm stored when the apparatus is not in use.
Figure 1:
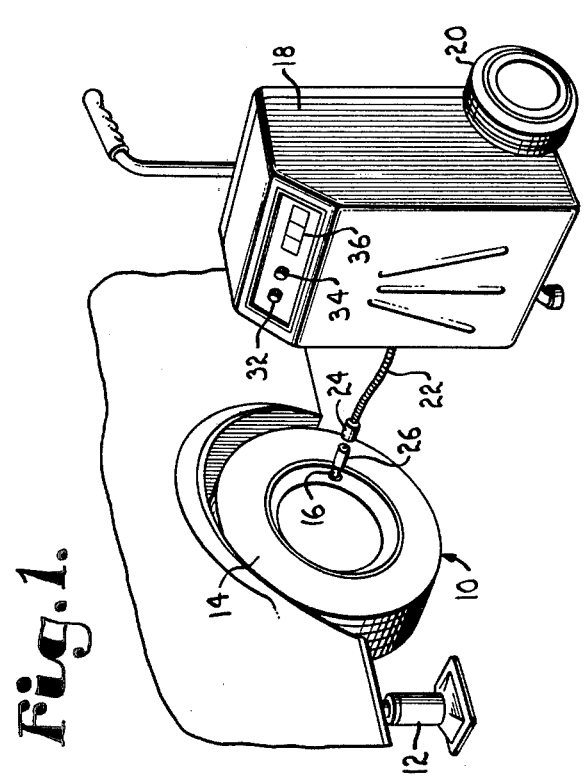
FIG. 1 is a perspective view showing a vehicle fragmentarily with one of its driven wheels raised, and the testing apparatus of the present invention in use in conjunction with such wheel.

Referring initially to FIGS. 1 and 2, one of the rear wheels 10 of an automobile (shown fragmentarily) is illustrated in FIG. 1 elevated from the road surface by a suitable jack 12. The wheel 10 is provided with the usual tire 14 having a valve stem 16. A case 18 houses the testing unit and, for convenience, is provided with a pair of wheels 20 to allow the case 18 to be easily moved to the test site and positioned by the operator.

Figure 3:
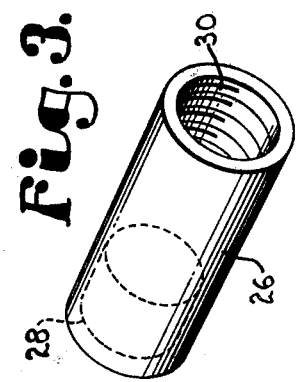
FIG. 3 is a greatly enlarged, detail view of the permanent magnet and threaded tubular member housing the same.

A flexible arm 22 extends from one side of the case 18 and has a pickup head 24 on its outer end. A tubular member 26 of nonmagnetic material is shown threaded on the valve stem 16 in FIG. 1, and is illustrated in detail in FIG. 3. The member 26 houses a permanent magnet component 28 adjacent one end thereof, the opposite end of the member 26 being internally threaded as seen at 30 in FIG. 3.

The controls for the testing unit on the front panel of case 18 include a pair of tire size selector knobs 32 and 34 which are set in accordance with the circumference of the tire 14. The tens digit of the circumference (measured in inches) is selected by knob 32, and the units digit is selected by knob 34 as will be discussed more fully hereinbelow. A digital display 36 indicates the speed of the vehicle as computed by the testing apparatus, an indicated speed of 55.3 miles per hour being illustrated in FIG. 2.

The testing unit is shown in detail in FIG. 4. A crystal oscillator 38 generates a time base signal at a selected frequency, the method of frequency selection to be sebsequently discussed. The signal is fed to a decade counter 40 having four binary-coded outputs identified by the numerals "1", "2", "4" and "8" respectively. The outputs of counter 40 are connected to a binary-coded decimal to decimal converter 42 having ten decimal outputs "0" through "9". In FIG. 4, only the "0", "1", "2" and "9" outputs of converter 42 are illustrated. A rotary switch 34a has ten contacts to which the respective outputs of converter 42 are connected, and a movable pole for selecting any one of such outputs. Switch 34a selects the units digit ($N_u$) of the tire circumference.

Similarly, a second decade counter 44 has four binary-coded outputs "1", "2", "4" and "8" connected to the input of a second binary-coded decimal to decimal converter 46. The counting input 48 of counter 44 is connected to the "8" output of the counter 40. For purposes of illustration, four decimal outputs of the converter 46 are shown and correspond to the digits "6", "7", "8" and "9". A rotary switch 32a has its selectable contacts connected to respective outputs of the converter 46, and the movable pole thereof is shown in contact with "8" output corresponding to the tens digit ($N_t$) of the tire circumference. Accordingly, the tire size selector switches 32a and 34a are shown set for a tire circumference of 80 inches, it being understood that in the embodiment of FIG. 4 any circumference from 60 to 99 inches may be selected in one-inch increments. The knobs 32 and 34 (FIGS. 1 and 2) operate the rotary poles of the respective switches 32a and 34a.

Each of the poles of the switches 32a and 34a is connected to a corresponding input of a 2-input AND gate 50, the output thereof being connected to a reset input 52 of counter 40 and a reset input 54 of counter 44. The counters 40 and 44, converters 42 and 46, and associated circuitry just described comprise a scaler which divides the time base signal from oscillator 38 by an appropriate divisor that is selected in accordance with the tire size of a particular vehicle under test. The output from the scaler is in the form of a reference signal that appears on a line 56 connected to the "8" output of the counter 44. Such output line 56 extends from the scaler to one input of a 2-input AND gate 58 in the computer section of the apparatus.

The pickup head 24 may comprise a magnetic pickup as illustrated schematically in FIG. 4 by a coil 24a having a ferrite core 24b. The presence of the permanent magnet 28 is sensed by the coil 24a (as will be discussed) and a pulse is produced which is amplified by amplifier 60 and fed to the clock input C of a flip-flop 62. In order to eliminate the need for a manual on/off switch, a detector 64 also receives pulses from amplifier 60 and, at the beginning of a test, closes a switch 66 in a power line lead 68. The lead 68 would extend to the transistors and other power-consuming devices of the apparatus. The detector 64 is an integrator circuit and the switch 66 may, for example, comprise a transistor switch which connects the lead 68 to a battery 70 or other suitable power source upon closure thereof.

The flip-flop 62 has its Q output connected to the other input of AND gate 58, the $\overline{Q}$ input thereof being connected to the enable input E of an arithmetic circuit 72. The $\overline{Q}$ output of flip-flop 62 is also connected to the enable input E of a timing circuit 74 having two outputs 76 and 78. The output 76 is connected to the reset input R of arithmetic circuit 72, and is also connected to the reset input R of a 4-stage decimal counter 80. The output of AND gate 58 is fed to the clock input C of counter 80.

The output 78 of timing circuit 74 controls a buffer-storage stage 82 and is connected to the strobe or load input L thereof. The counter 80 has an output 84 which is connected to the input of arithmetic circuit 72, the output information from circuit 72 being fed to the buffer-storage stage 82. A binary-coded decimal to 7-segment decoder-driver 86 receives the information from stage 82 and drives the digital display 36, which is a three-digit display having a fixed decimal point between the second and third digits.

As illustrated in FIG. 1, the apparatus of the present invention may be conveniently employed at a service station or other facility where vehicle speedometers are to be checked and calibrated. The illustration is an example of the manner in which the apparatus is used to check the speedometer of a vehicle having a conventional drive (rear wheels driven). The left rear wheel is raised from the road surface by the jack 12 (for vehicles with positive rear traction, both rear wheels must be off the ground). The valve cap (not shown) is removed from the valve stem 16 and is replaced with the tubular member 26. The internal threads 30 mate with the external threads provided on the valve stem 16 so that the member 26 may be quickly and releasably mounted on the stem. In certain instances the valve stem 16 is unaccessible for mating with the tubular member 26, or if accessible, is in such a location as to disallow proper proximal positioning of the pickup head 24. This situation is particularly applicable to truck wheels 116. In such cases, a generally frustoconical shaped nonmagnetic member 102 housing a permanent magnet 104, as shown in FIGS. 6-9, is used. A housing member 106 has at one end a threaded projection 108 which mates with the threads 110 on a nut 112 so that the projection 108 extends toward a medial longitudinal position within the nut orifice. The remaining nut free threads 110 functionally mate with lug extensions 114 projecting from the truck wheel 116 so that the member 102 may be quickly mounted and dismounted from a selected wheel lug.

The use of such releasably secured members 26 and 102 with magnets therein, is fast and convenient, assures that the respective members 26 or 102 are held fast to the wheel regardless of the speed of rotation and allows each member 26 or 102 to be used on subsequent vehicles, thus obviating the need to permanently secure such magnetic components to the wheel. Subsequent discussion is directed to the use of the member 26 but it is understood that the member 102 is similarly used with the same accruing advantages and results.

OPERATION

With the member 26 secured to the stem 16 as illustrated in FIG. 1, the permanent magnet 28 contained within the outer end of the member 26 is completely clear of the tire 14. Accordingly, the case 18 is wheeled alongside the tire 14 and the flexible arm 22 is extended as shown in FIG. 1 to position the pickup head 24 in closely spaced relationship with the magnet 28 (preferably within one inch from the outer end of the member 26). The tire size selector knobs 32 and 34 are set in accordance with the circumference of the raised tire 14 which, in the example set forth herein, is 80 inches and may be measured with a tape measure once the tire 14 is elevated from the road surface.

The engine of the vehicle is accelerated to a desired speedometer reading, and the digital display 36 indicates the correct speed. To calibrate the speedometer, tests may be conducted in increments of 10 miles per hour beginning at 10 mph through the speedometer range. The speedometer reading and the corresponding reading on display 36 are recorded at each speed checked. Therefore, in a matter of a few minutes the speedometer is accurately calibrated and the testing is completed. If desired for greater convenience, the apparatus may be divided into two units to allow greater flexibility in the location of the case 18 containing the digital display 36; for example, the pickup head 24 and amplifier 60 may be in a separate unit alongside the rotating wheel which would then be connected by suitable cabling to the scaler and computer circuitry.

An exemplary idealized computation made by the present invention will now be set forth. The speed S in miles per hour is represented by the following expression:

$$S = \frac{C \text{ (in)} \cdot f \cdot 3600 \text{ sec}}{12 \text{ in} \cdot 5280 \text{ ft}}$$

Inverting and simplifying:

$$1/S = 63360/3600Cf = (17.6/C) \cdot 1/f$$

where
C = circumference of tire
1/f = period of one wheel revolution.

Accordingly, the frequency of the time base signal from the crystal oscillator 38 would be set at 1,760 KHz. Therefore, when C=80 inches, the frequency of the reference signal delivered along output line 56 is 1760/80 or 22 KHz. Assuming 1/f=1/10 sec, with 22,000 Hz gated to counter 80:

$$S = \frac{1}{2200} = .000455 \text{ or } 45.5 \text{ mph after decimal point correction.}$$

However, during field testing it has been found that compensation is required to be made to the crystal oscillator frequency of 1,760 KHz. Such compensation is necessary as the effective tire circumference (80 inches as used above) is greater when the tire is in a raised position, than when in functional contact with the road. As shown in FIG. 10, $R_L$ denotes the minimum radius of the tire over the arc S when in a road contacting or loaded position. The radius of the raised tire or the unloaded radius is denoted as $R_U$ and is a constant. Formulaically the unloaded tire circumference is greater than the loaded tire circumference. The circumferential differences are graphically shown in FIG. 10 with the flat portion of the tire, due to road contact, shown by the chord across the arc S. In the above formulae a greater tire circumference (C) results in measured speeds (S) of greater velocity when the tire is in a raised position, than when in road contact.

Comparative tests of various makes and models of passenger cars and trucks have been conducted which have determined a representative correction factor to be applied to the 1,760 KHz time base frequency so that readings on the testing unit digital display 36 are accurate within one-half mph at 55 mph for both automobiles and trucks regardless of make or model. It has been found that an increase of oscillator frequency of 3.85 percent for automobiles and 2 percent for trucks achieves the above-mentioned accuracy. (Of course, a tire that decreases in effective circumference exactly 3.85 percent (or 2 percent) provides theoretically perfect accuracy.) Thus, with such oscillator correction frequency, representative of an effective wheel radius, proper calibration of the vehicle speedometer can be made so as to assure the vehicle operator that the calibration will be accurate when the vehicle tires are lowered into a road contacting position.

For use with automobiles, compensation of the 1,760 KHz frequency results in a compensated frequency of 1,828 KHz. Therefore, when C=80 inches, the frequency of the reference signal delivered along output line 56 is 1828/80 or 22.85 KHz. Assuming 1/f=1/10 sec with 22,850 Hz gated to counter 80:

$$S = \frac{1}{2285} = .0004376 \text{ or } 43.8 \text{ mph after decimal point correction.}$$

Subsequent discussion will refer to this automobile corrected frequency, but it is understood that the truck corrected frequency (1795 KHz) is used when appropriate.

Figure 5:
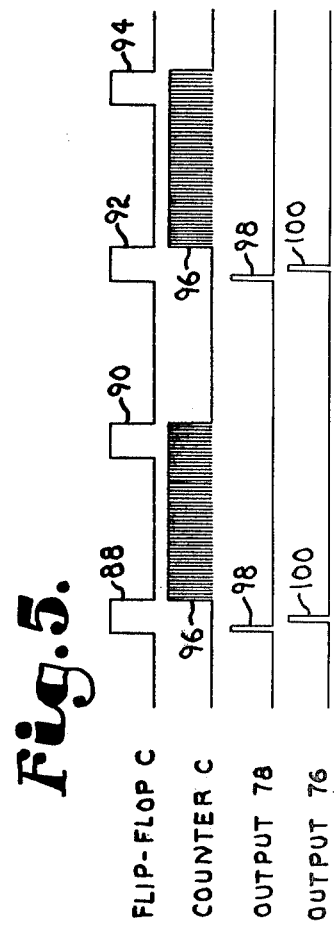
FIG. 5 is a timing chart showing pulses and logic levels at four points in the circuitry of FIG. 4 to illustrate the operation thereof.

The manner in which such computations are made by the apparatus may be appreciated from a study of FIGS. 4 and 5. Positive logic is used herein, and the clock and reset inputs of the logic elements are triggered on the negative-going (trailing) edge of an input pulse. Referring first to the scaler circuitry, it may be appreciated that the AND gate 50 will produce an output (and reset the decade counters 40 and 44 on the next count) only when both of its inputs are at the high logic level, and this occurs only when the counters have counted to 80 as represented by the high logic level appearing on the "8" output of converter 46 and the "0" output of converter 42. Accordingly, with the tire size selector switches 32a and 34a set as illustrated, the circuitry is in effect a divide-by-80 network which delivers a 22.85 KHz reference signal along output line 56 in response to the 1,828 KHz time base signal from the crystal oscillator 38. In the embodiment illustrated, any divisor from 60 to 99 may be selected; in actual practice it may be desired to expand the tire size selector to cover a greater range of possible tire circumference.

The pickup coil 24a produces a pulse each time the wheel revolves and the magnet 28 passes in proximal relationship to the coil 24a. Accordingly, an individual pulse is produced upon each revolution of the wheel, and the amplifier 60 delivers a train of pulses having a repetition rate proportional to the speed of rotation of the wheel. This pulse train is fed to the clock input C of the flip-flop 62 and is represented in FIG. 5 by the series or pulses 88, 90, 92 and 94. The trailing edge of pulse 88 drives the Q output of flip-flop 62 high, and the AND gate 58 opens to deliver the reference signal to the clock input C of the 4-stage decimal counter 80. The reference signal is schematically indicated at 96 in FIG. 5; it commences at the trailing edge of pulse 88 and terminates at the trailing edge of pulse 90 when the $\overline{Q}$ output of flip-flop 62 goes high and the Q output goes low. In the example expressed mathematically above, the count accumulated in counter 80 would be 2285. When the $\overline{Q}$ output of flip-flop 62 goes high, the arithmetic circuit 72 is enabled and functions as an inverter so that speed information is obtained. In the above example, the circuit 72 inverts the 2285 count to obtain 43.8 mph with appropriate relocation of the decimal point.

The information in the arithmetic circuit 72 must now be loaded into the buffer-storage stage 82 and both the circuit 72 and the counter 80 reset. This is accomplished by the timing circuit 74 which is enabled when the $\overline{Q}$ output of flip-flop 62 goes high (trailing edge of pulse 90). The timing circuit 74 may comprise a dual monostable multivibrator that produces a first timing pulse 98 at output 78 which is delivered to the load input L of the buffer-storage stage 82. Then, after the transfer of the speed information from the arithmetic circuit 72 to the stage 82, a second pulse 100 is delivered at output 76 and resets both the counter 80 and the circuit 72. This completes the speed computation until the next wheel pulse 92, at which time the process repeats to continuously update the speed indication of display 36 every other time the wheel undergoes a revolution.

It should be understood that the three-digit indication to the nearest tenth provided by the display 36 is purely exemplary. In many applications, particularly due to the representative correction factor to compensate for tire deformation, elimination of the decimal point and reading to the nearest mile per hour is adequate. Also, it should be understood that the apparatus is equally suitable for calibrating to metric units and by changing the frequency of the oscillator 38 accordingly.

Although the permanent magnets 28 or 104 and pickup head 24 are the preferred components for generating the train of wheel pulses, there are alternative sensing arrangements that could be employed if desired. Rather than the magnetic pickup head, a read switch could be substituted for the coil 24a and core 24b. For strictly mechanical sensing, the permanent magnet 28 could be replaced by a trip arm on the valve stem 16 which would actuate a microswitch during each wheel revolution, the microswitch being supported on the end of the arm 22 in lieu of the pickup head 24. Another alternative would be to employ a light-absorptive or reflective material on the valve stem and utilize a light source and photoelectric detector instead of the pickup head 24. Additionally, the rotation of the wheel could be sensed by the proximity of resonant circuits by mounting a coil and capacitor combination on the valve stem and utilizing like components in a pickup head forming the tank circuit of an oscillator, in which case the momentary coupling of power between the resonant circuits would be detected by a dip in tank current.

Having thus described the invention, what is claimed as new and desired to be secured by Letters Patent is:

1. In combination, with a driven vehicle wheel having a threaded element projecting outwardly therefrom and provided as a standard part thereof, apparatus for determining the accuracy of the vehicle speedometer comprising:
    a testing unit for evaluating the speed of said vehicle corresponding to the rotative speed of said driven vehicle wheel, said testing unit having means for receiving a train of electrical pulses corresponding to said wheel rotative speed, computing means responsive to said pulses for determining vehicle speed corresponding to said wheel rotative speed, and means for indicating to a testing unit operator said determined vehicle speed,
    a device for producing said electrical pulses at a repetition rate proportional to said wheel rotative speed,
    said device including a magnetic component threadably mounted on said element for rotation therewith along a predetermined path of travel about the rotative axis of said wheel, and pulse output means associated with said testing unit having a sensor independent of said vehicle, said testing unit having means for positioning said sensor at a point adjacent said component path of travel, and
    said sensor being capable of detecting the presence of said component as it passes the sensor in proximal relationship thereto to cause said pulse output means to deliver said train of pulses to said testing unit receiving means.

2. The apparatus as claimed in claim 1, further comprising:
    a mounting member carrying said component, said member having means releasably securing the same to said standard element, said element a tire valve stem protruding from said vehicle wheel.

3. The apparatus as claimed in claim 1, further comprising:
    a mounting member carrying said component,
    a projection extending from said mounting member,
    a threaded nut engaging said projection coupling said mounting member to said nut, wherein said standard element is a wheel lug extending from said wheel, and,
    the free threads of the nut functionally engage said lug so as to releasably secure said mounting member thereto.

4. The apparatus as claimed in claim 3, wherein:
    said mounting member is frusto-conical in shape housing said magnetic component therein, and
    said projection extends from a longitudinal end thereof.

5. The apparatus as claimed in claim 3, wherein:
    said projection is threaded functionally engaging said threaded nut thereto.

6. Apparatus for testing the speedometer of a vehicle having a wheel provided with a tire which has a predetermined, unloaded radius in free rotation and which undergoes deformation when in contact with a road surface to present a smaller radius over the area of surface contact, said apparatus comprising:
    input means for producing a train of electrical pulses having a repetition rate proportional to the speed of rotation of said wheel,
    compensated oscillator means for producing a reference signal having a frequency representative of a reduced, effective radius of the wheel caused by said tire deformation,
    computing means coupled with said input means and said compensated oscillator means and responsive to said pulse train and said reference signal for determining the speed of the vehicle corresponding to the rotative speed of the wheel of said effective radius, and
    display means coupled with the output of said computing means for indicating the speed of the vehicle in predetermined units of measure.

7. In apparatus for testing the accuracy of a vehicle speedometer where means is employed for producing a train of repetitive electrical pulses at a rate proportional to the speed of rotation of a driven vehicle wheel, said pulses used as input along with a generated reference signal for processing by computing means resulting in a determinable indication of vehicle speed the improvement comprising:

said reference signal is generated by selectively operable means producing a frequency dependent upon the size of a tire on said wheel, including means for generating a time base signal of fixed frequency, and scaler circuitry responsive to said time base signal for dividing the frequency thereof by any number over a range of numbers corresponding to a range of tire sizes, and a tire size selector connected with said circuitry for selecting a divisor within said range of numbers to cause said scaler circuitry to deliver said reference signal.

8. The apparatus as claimed in claim 7, wherein:

said pulse production means produces an individual pulse upon each revolution of said wheel, and said computing means includes a counter responsive to said reference signal and gating means for alternately enabling and resetting said counter in response to successive pulses of said train.

9. A method of testing the speedometer of a stationary vehicle having a driven wheel from which a treaded projection extends, said method comprising the steps of:

raising said driven wheel to an elevation where a tire thereon is out of engagement with the road surface, removably securing a component to said projection having a characteristic that enables the component to be sensed as the wheel rotates and the component passes in proximal relationship to a sensor therefor; driving said wheel, producing a train of electrical pulses having a repetition rate proportional to the speed of rotation of the wheel, in response to said sensor positioned adjacent the path of travel of said component, and processing said pulse train to determine the speed of the vehicle corresponding to the rotative speed of the wheel.

10. The method as claimed in claim 9, further comprising the step of comparing the speedometer reading at each of a number of indicated speeds of the vehicle over the range of the speedometer with the corresponding speed of the vehicle determined by said processing of the pulse train, whereby to calibrate the speedometer.

11. The method as claimed in claim 9, wherein said projection is a valve stem.

12. The method as claimed in claim 9, wherein said projection is a lug bolt.

13. The method as claimed in claim 9, further comprising the steps of:

measuring the circumference of said raised wheel, and processing said pulse train in accordance with said measured circumference to determine the speed of the vehicle corresponding to the rotative speed of the wheel.

14. The method as claimed in claim 9, wherein the step of processing said pulse train includes compensating for the absence of tire deformation that will occur in use when the tire is in engagement with a road surface.

15. The method as claimed in claim 9, further comprising:

the additional step of measuring the circumference of the raised driven wheel, said processing step including compensating for the effective reduction in said circumference that will occur in use when the tire is in engagement with a road surface.

16. The method as claimed in claim 9, further comprising the step of releasing said component from said projection after said pulse train is processed and the speed has been determined, whereby said component is repeatedly used in subsequent speedometer tests.

* * * * *

UNITED STATES PATENT OFFICE
CERTIFICATE OF CORRECTION

PATENT NO. : 4,185,489
DATED : January 29, 1980
INVENTOR(S) : MAURICE DAVID SULLIVAN, JR.

It is certified that error appears in the above-identified patent and that said Letters Patent are hereby corrected as shown below:

Column 9,
Claim 9, line 22, change "treaded" to --threaded--.

Signed and Sealed this

Thirteenth Day of May 1980

[SEAL]

Attest:

SIDNEY A. DIAMOND

Attesting Officer

Commissioner of Patents and Trademarks